Aug. 21, 1951  E. L. BOSSI  2,565,016
WORK FEEDING DEVICE
Filed Nov. 13, 1947  3 Sheets-Sheet 1
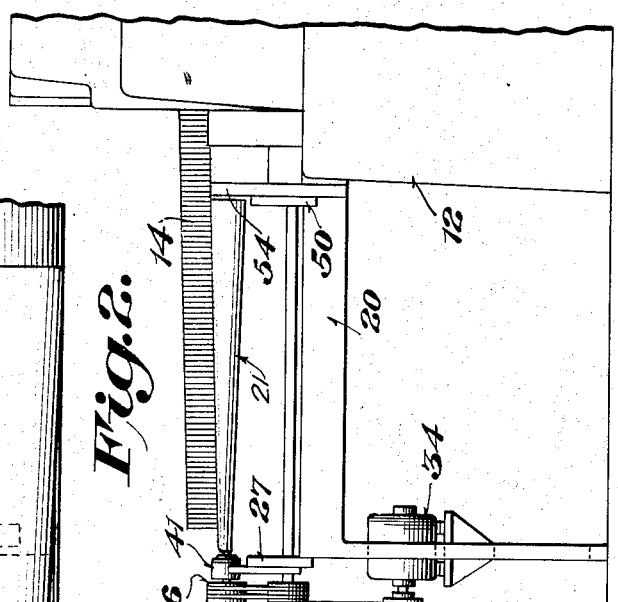
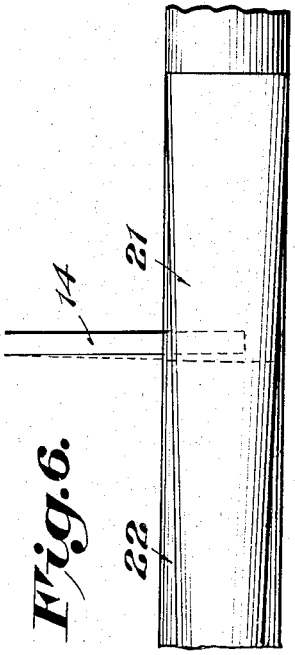
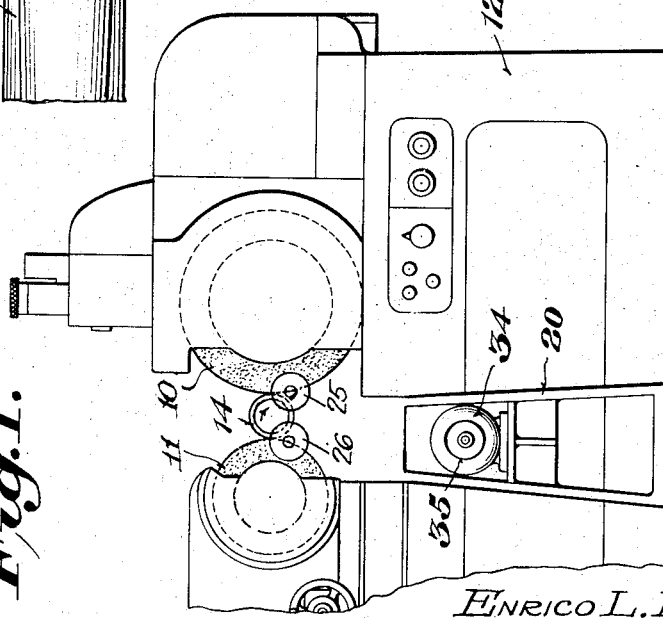
Inventor
ENRICO L. BOSSI,
By
Hugh N. Rocks
Attorney

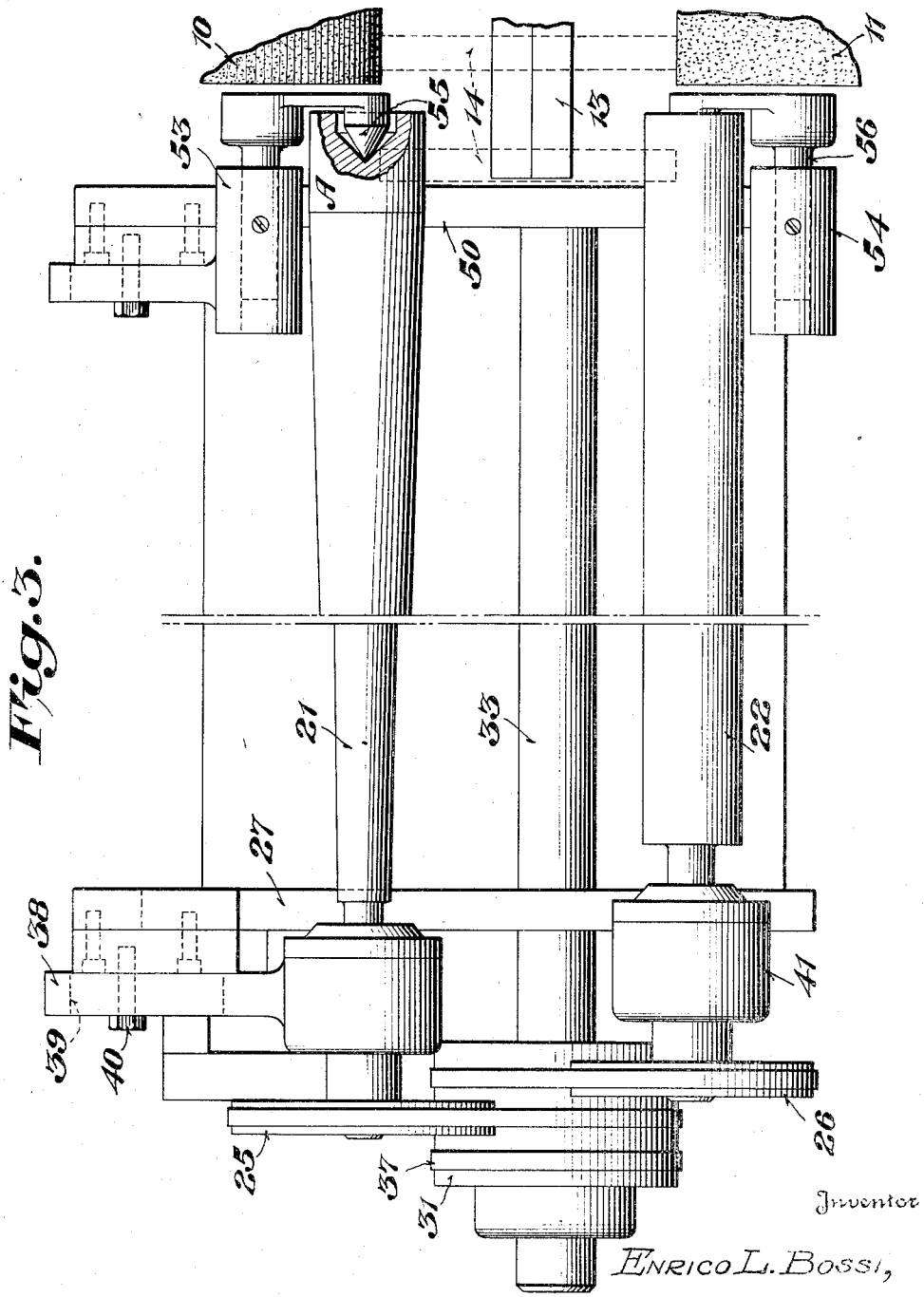

Aug. 21, 1951 E. L. BOSSI 2,565,016
WORK FEEDING DEVICE
Filed Nov. 13, 1947 3 Sheets-Sheet 3

Inventor
ENRICO L. BOSSI,
By
Hugh N. Roeher
Attorney

Patented Aug. 21, 1951

2,565,016

UNITED STATES PATENT OFFICE 2,565,016

WORK FEEDING DEVICE

Enrico L. Bossi, Bristol, Conn., assignor to Landis Tool Company, Waynesboro, Pa.

Application November 13, 1947, Serial No. 785,657

7 Claims. (Cl. 51—103)

This invention relates to apparatus for feeding work pieces to a centerless grinder.

In through feed centerless grinding, the work is traversed past the grinding wheel at a rate determined by the speed and angular adjustment of the control wheel. However, this rate may vary or the work may stop due to unforeseen occurrences and for this reason it is important that the feeding mechanism be impositive in action. However, with impositive feeding mechanisms there is usually a tendency to slow down or stop for heavy loads and to speed up for light loads.

It is therefore an object of this invention to provide a feed mechanism that will be impositive in action and still function at a predetermined rate regardless of the load.

It is also important that work pieces such as antifriction bearing rings be introduced into the grinding throat in a direction parallel with the grinding wheel axis. It is therefore a further object of this invention to provide a loading apparatus which will accomplish this result.

This invention provides a power operated loading device minus the pushing apparatus.

In the drawings:

Figure 1 is a front elevation of a centerless grinder showing the feeding mechanism.

Figure 2 is a partial right hand elevation of said machine showing said feeding mechanism.

Figure 3 is a plan view of the feeding mechanism applied to a machine in which the wheels 10 and 11 are in relative positions opposite to that shown in Figure 1.

Figure 4:
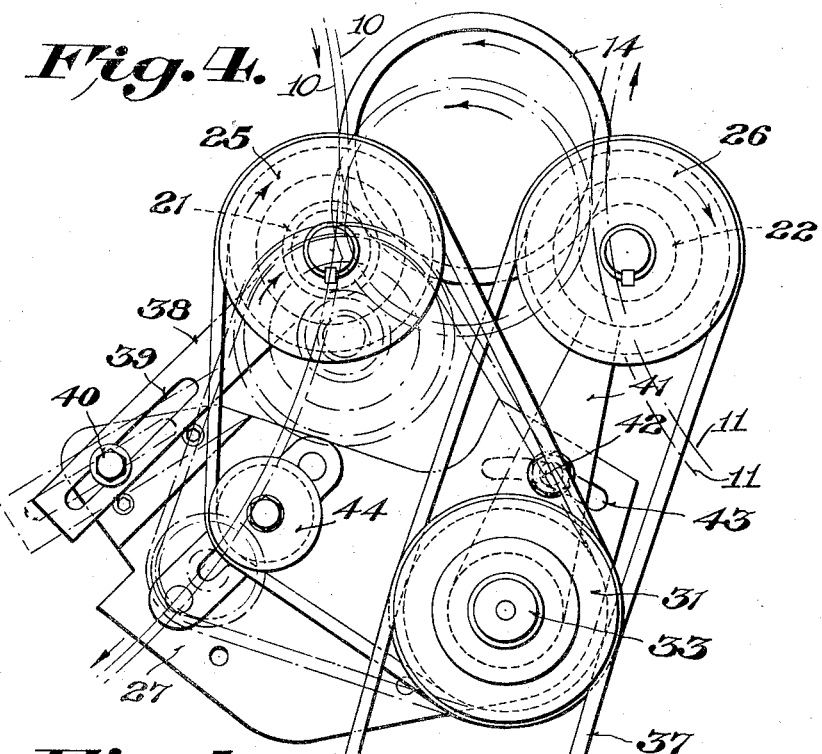
Figure 4 is a close up of the roller supporting and driving mechanism.
Figure 5:
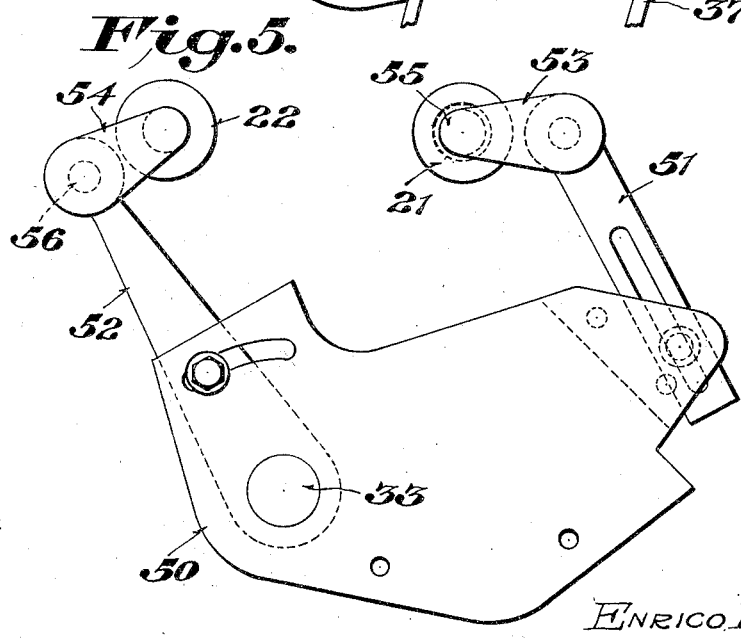
Figure 5 is a rear view close up of the supporting member adjacent the grinding throat in Figure 4.

Figures 3, 4 and 5 relate to a loading device for a machine in which the grinding and control wheels are arranged in opposite relation to that shown in Figures 1, 2 and 6.

Figure 6 is a close up showing the relation of feed rollers and work in the machine of Fig. 1.

Numerals 10 and 11 indicate the grinding and control wheels respectively of a centerless grinder. The bed of the machine is indicated by numeral 12. A work rest 13 supports the work 14 in operative relation to said wheels.

The means for feeding the work consists of a base member 20 on which a pair of rollers 21 and 22 are rotatably mounted for substantially universal adjustment. The section of roller 21 at A is of a different taper than the rest of the roller. The angle of the surface of section A is such that work pieces thereon are moving in a horizontal path and rotating about a horizontal axis. Roller 21 has a tapered surface with the large end adjacent the machine. Roller 22 is of uniform diameter. The rollers 21 and 22 are mounted in positions and rotate in directions corresponding to those of the grinding and control wheels respectively. In Figure 1 the grinding wheel 10 and the control wheel 11 rotate in a counterclockwise direction. Straight roller 22 adjacent the control wheel rotates in the same direction as the control wheel. Tapered roller 21 adjacent the grinding wheel rotates in the same direction as the grinding wheel.

Driving means for said rollers consists of a pulley 25 for the tapered roller 21 and for the cylindrical roller 22 a pulley 26. Said pulleys are adjustably mounted on a bracket 27 which may be integral with base 20 or may be removably attached thereto. Driving connection of any suitable design may be used between said pulleys and rollers. Said pulleys are connected by means of belts 30 to pulleys 31 and 32 on shaft 33. An adjustable speed motor 34 drives shaft 33 through pulleys 35 and 36 and belt 37. Pulley 25 is mounted on an arm 38 having a slot 39 whereby it is adjustably attached to bracket 27 by screw 40. This mounting permits lowering the small end of roller 21 to incline the axis thereof relative to that of roller 22. Pulley 26 is mounted on an arm 41 which may be adjustably attached to bracket 27 by means of screw 42. Adjustment is provided by a slot 43 in bracket 27. Change in center distance of pulleys 25 and 31 may be compensated for by an idler pulley 44 adjustably mounted on bracket 27.

The other ends of said rollers are adjustably supported on bracket 50 by means of arms 51 and 52, each having a jointed portion 53 and 54 respectively. Each of said jointed portions has a stub shaft 55 and 56 respectively on which the rollers 21 and 22 are rotatably supported. Roller 21 is pivotally mounted on stub shaft 55 to permit a change in angular relation between the roller axes. Arm 51 supporting the large end of tapered roller 21 and arm 52 supporting the corresponding end of roller 22 are attached to bracket 50 by means identical with those used for arms 38 and 41 respectively.

Operation

The operation and adjustment of the roller driving mechanism is obvious from the drawings and description. However, the action of the rollers on the work is not so apparent.

When the axes of both rollers are hrizontal the surface of the tapered roller is inclined relative to the surface of the cylindrical roller. Work pieces mounted on said rollers if parallel to one roller are skewed relative to the other as shown in Figure 6. The effect of such relation when the rollers are rotated is the same as the effect of a skewed control wheel, i. e., to cause endwise movement of the work pieces. As soon as a group of work pieces is placed on said rotating rollers, they fall into a position parallel with the surface of the tapered roller 21 and, therefore, at an angle to the straight roller 22. This angular relation of the work pieces with roller 22 is in a direction to move the work axially toward the grinding throat. The rate of movement may be increased by changing the speed of the rollers and also by lowering the small end of tapered roller 21 in a vertical direction so as to increase the angle of skew of the work pieces 14 relative to roller 22. This increases the relative feed component between roller 22 and work pieces 14 in the direction of the large end of roller 21. The rate of feed or the power available for feeding may be adjusted by changing the speed of motor 34. However, it is preferable to maintain a rate of rotation approximating that of the work being ground and to change the rate of feed by adjusting vertical position of the small end of tapered roller 21, as described above. The fact that the tapered roller already has its surface inclined in the proper direction for feeding work toward the machine makes possible a minimum of inclination of its axis in order to provide a satisfactory feed rate. Said adjustment may be effected by loosening screw 40 and by shifting arm 38, which supports roller 21, in a clockwise direction as well as downwardly along slot 39 until the small end of roller 21 is at a lower level than the corresponding end of roller 22. With this angular relation between the rollers, the work pieces assume a position parallel with the surface of the tapered roller 21 and thus they are in skewed relation with the straight roller 22. When roller 21 and work pieces 14 are rotated in this angular relation, roller 22 exerts an axial feeding action on said work pieces in the direction of the large end of the tapered roller. If work of different diameter is to be accommodated, roller 22 may be shifted in an arcuate path by loosening a screw 42 in slot 43. A similar adjustment of roller 21 may be made as described above. The opposite ends of said rollers may be adjusted by adjusting the position of arms 51 and 52. These arms are adjusted to change the spacing between the rollers and to raise or lower said rollers when work of a different diameter is to be handled.

The work pieces move along the rollers on an inclined path provided by the inclination and taper of said tapered roller until the change in taper of the tapered roller is reached when it changes to a substantially horizontal path in line with the work pieces already passing through the grinding throat.

With the apparatus described above the operator needs only to place a plurality of work pieces on the rollers 21 and 22, and the work pieces will be rotated in the proper direction for grinding and at the same time will be moved axially toward the grinding throat. There are no work pushing devices to be reset as in the prior art. The operator needs only to continue to place work pieces on the rollers, preferably a plurality of pieces at a time rather than a single piece.

I claim:

1. In a centerless grinding machine, peripherally opposed grinding and control wheels forming a grinding throat, work supporting means forming a part of said throat, feeding means for feeding work pieces into said throat comprising two roller members outside said throat and extending longitudinally thereof, means for rotating said rollers, one of said rollers being universally adjustable relative to the other and having a tapered surface with the large end adjacent the grinding throat to provide a longitudinal inclination of its surface relative to the other member in a direction to support and rotate work pieces in skewed relation to said other roller, and thus to feed said work pieces toward the grinding throat in response to rotation of said rollers.

2. In a centerless grinding machine, peripherally opposed grinding and control wheels forming a grinding throat, work supporting means forming a part of said throat, feeding means for feeding work pieces into said throat comprising two roller members outside said throat and extending longitudinally thereof, means for rotating said rollers, one of said rollers having a tapered surface with the large end adjacent the grinding throat whereby to provide a longitudinal inclination of its surface relative to the other roller in a direction to feed a work piece toward the grinding throat, means to incline the axis of said roller so as to increase the inclination of the surface thereof and thus to increase the rate of feed of said work pieces, the large end of said tapered member having a portion at a different angle so that the axial surface thereof is parallel with the work support, and work moving thereon will be rotating about an axis parallel with the work supporting means in said grinding throat.

3. In a centerless grinding machine, peripherally opposed grinding and control wheels forming a grinding throat, work supporting means forming a part of said throat, feeding means for feeding work pieces into said throat comprising two roller members outside said throat and extending longitudinally thereof, means for rotating said rollers one of said rollers having a tapered surface with the large end adjacent the grinding throat whereby to provide a longitudinal inclination of its surface relative to the other member in a direction to feed a work piece toward the grinding throat, and means on one of said rollers for changing the degree of inclination of the path of movement of the work to a path substantially parallel with the surface of the work supporting means.

4. In a centerless grinding machine, peripherally opposed grinding and control wheels forming a grinding throat, work supporting means forming a part of said throat, feeding means for feeding work pieces into said throat comprising two roller members outside said throat and extending longitudinally thereof, means for rotating said rollers one of said rollers having a tapered surface with the large end adjacent the grinding throat for rotatably supporting a work piece in angular relation to said other roller, means for positioning the small end of said tapered roller at a lower level than the corresponding end of said other roller and thus to increase said angular relation, said other roller being effective because of said angular relation with the work piece to cause endwise movement of said work piece in the direction of the grinding throat.

5. In a centerless grinding machine, peripherally opposed grinding and control wheels forming a grinding throat, work supporting means forming a part of said throat, feeding means for feeding work pieces into said throat comprising two roller members outside said throat and extending longitudinally thereof, and means for rotating same, one of said rollers having a tapered surface with the large end adjacent the grinding throat and the axis thereof inclined so that the small end is at a lower level than the corresponding end of the other roller to support work pieces in such angular relation to said other roller that said work pieces are fed by said other roller toward the grinding throat, said tapered roller being pivotally supported at the large end, the axis of said roller being adjustable on said pivot to change said angular relation.

6. In a centerless grinding machine, peripherally opposed grinding and control wheels forming a grinding throat, work supporting means forming a part of said throat, feeding means for feeding work pieces into said throat, comprising two roller members outside said throat and extending longitudinally thereof, means for rotating said rollers, one of said rollers having a tapered surface with the large end adjacent the grinding throat whereby to provide a longitudinal inclination of its surface relative to the other roller in a direction to feed the work piece toward the grinding throat, means to incline the axis of said roller so as to increase the inclination of the surface thereof relative to said other roller and thus increase the rate of feed of said work pieces.

7. In a centerless grinding machine, peripherally opposed grinding and control wheels forming a grinding throat, work supporting means forming part of said throat, feeding means for feeding work pieces into said throat, comprising two roller members outside said throat and extending longitudinally thereof, means for rotating said rollers to rotate the work pieces thereon in the same direction as the work pieces in the grinding throat, one of said rollers having a tapered surface with the large end adjacent the grinding throat whereby to provide a longitudinal inclination of its surface relative to the other roller in a direction to cause said other roller to feed the work pieces toward the grinding throat, means for adjusting the rate of feed of said work pieces while maintaining a rate of rotation approximating that of the work pieces being ground by adjusting the small end of said tapered roller in a vertical plane.

ENRICO L. BOSSI.

REFERENCES CITED

The following references are of record in the file of this patent:

UNITED STATES PATENTS

| Number | Name | Date |
|---|---|---|
| 1,804,422 | Koch | May 12, 1931 |
| 1,837,821 | Holmes | Dec. 22, 1931 |
| 1,952,157 | Caster et al. | Mar. 27, 1934 |